United States Patent [19]
Ishiyama

[11] 3,904,477
[45] Sept. 9, 1975

[54] PROCESS FOR PRODUCING 3', 5'-CYCLIC ADENYLIC ACID WITH MICROORGANISM
[75] Inventor: Jiro Ishiyama, Noda, Japan
[73] Assignee: Kikkoman Shoyu Co., Ltd., Noda, Japan
[22] Filed: Feb. 21, 1974
[21] Appl. No.: 444,507

[30] Foreign Application Priority Data
Feb. 23, 1973 Japan.............................. 48-21342

[52] U.S. Cl. ................................ 195/28 N; 195/28
[51] Int. Cl.² ......................................... C12D 13/06
[58] Field of Search ................................. 195/28 N

[56] References Cited
UNITED STATES PATENTS
3,816,251  6/1974  Nakayama et al. ............... 195/28 N

*Primary Examiner*—Alvin E. Tanenholtz
*Attorney, Agent, or Firm*—Schuyler, Birch, Swindler, McKie & Beckett

[57] ABSTRACT

3',5'-Cyclic adenylic acid is produced in a high yield at a lower price by culturing a strain of microorganism belonging to the genus Microbacterium, such as, for example, Microbacterium No. MT-3 (ATCC 21981, FERM-P No. 787) and Microbacterium No. 205-M-32 (ATCC 31001, FERM-P No. 1559) in a medium containing nutrient sources such as, carbon sources, nitrogen sources, inorganic salts and the like in the presence of metal ions such as $Mn^{++}$, $Fe^{++}$, $Fe^{+++}$ and the like in an amount of 0.02 mg/l or more as $MnCl_2.4H_2O$, 10 mg/l or more as $FeCl_2.7H_2O$ and/or 10 mg/l or more as $FeCl_3.7H_2O$, respectively, but containing no precursors at pH of 5–10 and at a temperature of 20°–40°C under aerobic condition. The obtained 3',5'-cyclic adenylic acid is well-known for its participation in various biochemical reactions in vivo and for its active role as a mediator to various hormones. It has therefore always been highly evaluated biochemical reagent.

7 Claims, No Drawings

PROCESS FOR PRODUCING 3′, 5′-CYCLIC ADENYLIC ACID WITH MICROORGANISM

The present invention relates to a process for producing 3′,5′-cyclic adenylic acid by culturing microorganisms.

It has been well-known that 3′,5′-cyclic adenylic acid participates in various biochemical reactions in vivo and that it plays an active part as a mediator for various hormones. It has therefore been highly evaluated biochemical reagent.

As a process for producing 3′,5′-cyclic adenylic acid (hereinafter referred to as CAMP), the present inventor or others have established processes for producing CAMP by culturing a microorganism belonging to the genus selected from the group consisting of Corynebacterium, Arthrobacter or Microbacterium and having a capability of producing CAMP from a precursor such as, for example, adenine, hypoxanthine, succinyl adenine, 5-amino-4-imidazolecarboxamide, 7-aminopyrazolo-(4,3-d)-pyrimidine, pyrazolo-(4,3-d)-pyrimidine, 4-amino-pyrrolo-(2,3-d)-pyrimidine, pyrrolo-(2,3-d)-pyrimidine, a riboside containing one of said compounds as a base [Adenosine, inosine, succinyladenosine, 5-amino-4-imidazolecarboxamideriboside, 7-amino-3-($\beta$-D-ribofuranosyl)-pyrazolo-(4,3-d)-pyrimidine (Formycin A), 3-($\beta$-D-ribofuranosyl)-pyrazolo-(4,3-d)-pyrimidine (Formycin B), 4-amino-3-($\beta$-D-ribofuranosyl)-pyrrolo-(2,3-d)-pyrimidine (Tubercidin), 3-($\beta$-D-ribofuranosyl)-pyrrolo-(2,3-d)-pyrimidine (6-deaminotubercidin)], or a mononucleotide thereof [2′(3′ or 5′)-adenylic acid, 2′(3′ or 5′)-inosinic acid, 2′(3′ or 5′)-succinyladenylic acid, 5-amino-4-imidazolecarboxamideribose-2′(3′ or 5′)-phosphate, Formycin A-2′(3′ or 5′)-monophosphate, Formycin B-2′(3′ or 5′)-monophosphate, Tubercidin-2′(3′ or 5′)-monophosphate, 6-deaminotubercidin-2′(3′ or 5′)-monophosphate or the like] in a medium containing the foregoing precursor (See, for example, U.S. Pat. No. 3,630,842, Japanese Pat. No. 33/72, Japanese Pat. No. 34/72, Japanese Pat. No. 1,838/72, Japanese Pat. No. 1,839/72 and the like). CAMP can be produced at an extremely lower price with a great easiness by those processes as compared with the conventional ones by chemical synthesis, however, those processes are not always satisfactory ones since it is required to add a large amount of the foregoing compounds in the culture medium.

The present inventor and others have isolated, as a result of studying intensively on a process for producing CAMP using microorganisms, some mutants capable of producing CAMP, when cultured in a medium containing no foregoing precursors such as adenine and the like, that is, in an ordinary nutrient medium, by subjecting a microorganism capable of producing CAMP from the foregoing precursors such as, for example, Corynebacterium murisepticum No. 7 (ATCC 21,374, PERM-P No. 206), Arthrobacter 11 (ATCC 21,375, FERM-P No. 207), Microbacterium No. 205 (ATCC 21,376, FERM-P No. 106); the abbreviation "ATCC" stands for the access number registered by American Type Culture Collection, 12301 Parklawn Drive, Rockville Maryland, U.S.A., a public depository of U.S.A. and the abbreviation "FERM-P" stands for the access number registered by Fermentation Research Institute, Agency of Industrial Science and Technology, 5 chome 8-1, Inage, Chiba-shi, Japan, a public depository of Japan) or the like to treatment for artificial mutation and based on the aforesaid fact, a process for producing CAMP which is characterized by culturing in a medium containing nutrient sources such as carbon sources, nitrogen sources, inorganic salts and the like a microorganism belonging to the genus selected from the group consisting of Corynebacterium, Arthrobacter and Microbacterium and having a capability of producing CAMP in a medium containing no precursor such as, for example, adenine and the like and collecting the produced CAMP from the culture medium has been invented (Japanese Patent application No. 102780/72, U.S. patent application Ser. No. 405897 filed on Oct. 12, 1973).

As a result of further studies, the present inventor has found the fact that CAMP can be produced with a good yield by culturing a strain such as Microbacterium No. MT-3 (ATCC 21981, FERM-P No. 787), Microbacterium No. 205-M-32 (ATCC 31001, FERM-P No. 1559) and the like in a medium containing no precursor as mentioned above, such as adenine and the like, in the presence of 0.02 mg/l or more of manganese ion in terms of $MnCl_2 \cdot 4H_2O$, 10 mg/l or more of ferric ion in terms of $FeCl_2 \cdot 7H_2O$ and/or 10 mg/l or more of ferrous ion in terms of $FeCl_3 \cdot 7H_2O$. Based on the above finding, the present invention has been accomplished.

The manganese ion, ferric ion and ferrous ion are hereinafter referred to as $Mn^{++}$, $Fe^{++}$ and $Fe^{++}$, respectively.

An object of the present invention is to provide a process for producing CAMP by culturing a microorganism capable of producing CAMP in a medium containing no precursors in the presence of metal ions such as $Mn^{++}$, $Fe^{++}$, $Fe^{+++}$ and the like in a relatively high concentration.

Another object of the present invention is to provide a process for producing CAMP at a lower price with a great easiness compared with the conventional process.

Still another object of the present invention is to provide microorganism capable of producing CAMP in a medium containing no foregoing precursors in the presence of metal ions as mentioned above.

Other objects will become apparent from the following description.

The present invention is concerned with a process for producing CAMP which is characterized by culturing a microorganism belonging to the genus Microbacterium having a capability of producing CAMP in the presence of 0.02 mg/l or more of manganese ion in terms of $MnCl_2 \cdot 4H_2O$, 10 mg/l or more of the ferric ion in terms of $FeCl_2 \cdot 7H_2O$ and/or 10 mg/l or more of the ferrous ion in terms of $FeCl_3 \cdot 7H_2O$ and absence of precursors as mentioned above, such as for example adenine and the like, in a medium containing nutrient sources such as carbon sources, nitrogen sources, inorganic salts and the like and one or more of the above-mentioned metal ions in the above-mentioned concentrations.

According to the present process, CAMP can be produced at a lower price with a great easiness compared with the conventional one.

The invention will be illustrated in greater detail in the following description.

Any of the microorganisms may be employed in the present process if it belongs to the genus Microbacterium and has a capability of producing CAMP when cultured in a medium containing assimilable carbon source, nitrogen source, inorganic salts and the like in a sufficient quantity, but containing as a precursor no adenine, hypoxanthine, succinyladenine, 5-maino-4-imidazolecarboxamide, 7-amino-pyrazolo-(4,3-d)-pyrimidine, pyrazolo-(4,3-d)-pyrimidine, 4-aminopyrrolo-(2,3-d)-pyrimidine, pyrrolo-(2,3-d)-pyrimidine, a riboside containing as a base one of the above-mentioned compounds, a monoribonucleotide thereof or the like in the presence of 0.02 mg/l or more of $Mn^{++}$ in terms of $MnCl_2 \cdot 4H_2O$, 10 mg/l or more of $Fe^{++}$ in terms of $FeCl_2 \cdot 7H_2O$ and/or 10 mg/l or more of $Fe^{+++}$ in terms of $FeCl_3 \cdot 7H_2O$.

Typical of the microorganisms are, for example, Microbacterium No. MT-3 (ATCC 21981, FERM-P No. 787) and Microbacterium No. 205-M-32 (ATCC 31001, FERM-P No. 1559). These two strains are those resistant against $Mn^{++}$, $Fe^{++}$ or $Fe^{+++}$. The term "resistant" used in the present invention does not means that inhibition with metal ions for growing the microorganisms but for the productivity of CAMP. The Microbacterium No. MT-3 and Microbacterium No. 205-M-32 are artificial mutants obtained from Microbacterium No. 205 (ATCC 21376, FERM-P No. 106) as a parent strain.

To obtain such artificial mutants as mentioned above, the ordinary treatment for artificial mutation may be used effectively. For example, the parent strains are subjected to eradiation of x-rays, ultraviolet light or the like, treatment by a chemical mutagenic agent such as, for example, nitrosoguanidine, diethyl sulfate, methylethyl sulfate, $NaNO_2$, acridine, nitrogen mustard or the like. The thus obtained mutants are screened in the ordinary manner and then mutants which can be used for the purpose of the present process are only isolated.

As an example of treatments for mutation whereby a mutant strain employable for the present process may be obtained, the following method is given.

To 10 ml of a cell suspension (number of cells: $2-5 \times 10^9$/ml) of Microbacterium No. 205 at the logarithmic growth phase is added 0.1 m/l of diethyl sulfate, and the cells are contacted to the chemical with shaking for 16 hours at 30°C. The treated cells are inoculated in 300 ml of the same medium as described in Note 1 and further cultured with shaking for 16 hours at 30°C. After washing the collected cells by a phosphate buffer solution (pH 7.0), the washed cells are smeared to the same medium as described in Note 2 and cultured for 72 hours at 30°C. The appeared colonies are then picked up at random, inoculated in the same medium as described in Note 2 and the same medium as described in Note 2 except that $MnCl_2 \cdot 4H_2O$ is added at the rate of 1 ml, respectively, and cultured for 48 hours at 30°C. Thereafter, there is isolated the strains capable of growing in the former medium but incapable of growing in the latter medium. Subsequently, the thus isolated strains are cultured with shaking for 48 hours at 30°C in a medium (Note 3), and the accumulation of CAMP is checked by means of a paper chromatography. The one of the thus isolated strains capable of producing CAMP is called as Microbacterium No. MT-3.

Furthermore, the thus isolated strain Microbacterium No. MT-3 is subjected as a parent strain to diethyl sulfate treatment in a similar manner to the above-mentioned. The resultant cultured broth is smeared to the same medium as described in Note 2 except that 6-mercaptopurine is added at the rate of 200 mg/l and cultured for 160 hours at 30°C. The appeared colonies are picked up and inoculated in the same agar slant culture medium as described in Note 4 and cultured for 48 hours at 30°C. Following that, the microorganism is inoculated in the same medium as described in Note 5 and cultured with shaking for 48 hours at 30°C. Thereafter, the accumulation of CAMP is checked by means of a paper chromatography and one of the thus isolated chemical reagent-resistant strains having a capability of producing CAMP is called as Microbacterium No. 205-M-32.

The percentage showing the rate of each ingredient as hereinafter described is given in a figure divided the weight of the ingredient by the volume of the medium (W/V), that is, the term "%" denotes the weight of the ingredient in 100 ml of the medium.

Note 1

A medium composed of 1 % of beef extract, 0.1% of polypeptone, 0.5% of yeast extract, 0.3% of NaCl, 500 mg/l of $MnCl_2 \cdot 4H_2O$ and of pH 7.0; sterilized at a pressure of 15 lb. per sq. in. for 15 minutes.

Note 2

A medium composed of 1 % of glucose, 0.5 % of $(NH_4)_2SO_4$, 0.5 % of urea, 1 % of $KH_2PO_4$, 1 % of $K_2HPO_4$, 0.3 % of casamino acid, 30 γ/l of biotin, 1 % of $MgSO_4 \cdot 7H_2O$, 500 mg/l of $MnCl_2 4H_2O$, 2 % of agar and of pH 7.0; and sterilized at a pressure of 15 lb. per sq. in. for 10 minutes.

Note 3

A medium composed of 5 % of glucose, 0.5 % of urea, 0.5 % of $(NH_4)_2SO_4$, 1 % of $KH_2PO_4$, 1 % of $K_2HPO_4$, 0.3 % of meat extract, 0.3 % of corn steep liquor, 0.3 % of inosine, 1 % of $MgSO_4 \cdot 7H_2O$, 0.01 % of $ZnSO_4 \cdot 7H_2O$, 0.01 % of $FeSO_4 \cdot 7H_2O$, 0.0001 % of $MnSO_4 \cdot 5H_2O$ and of pH 8.0 (adjusted with 3N-KOH aqueous solution); sterilized at a pressure of 15 lb. per sq. in. for 12 minutes.

Note 4

A medium composed of 1 % of beef extract, 1 % of polypeptone, 0.5 % of yeast extract, 0.3 % of NaCl, 200 mg/l of 6-mercaptopurine, 2 % of agar and of pH 7.0; and sterilized at a pressure of 15 lb. per sq. in. for 15 minutes.

Note 5

A medium composed of 0.01 % of $ZnSO_4 \cdot 7H_2O$, 0.5 % of urea, 0.5 % of $(NH_4)_2SO_4$, 0.5 % of $KH_2PO_4$, 0.5 % of $K_2HPO_4$, 0.5 % of arginine, 30 γ/l of biotin, 5 % of glucose, 1 % of $MgSO_4 \cdot 7H_2O$, 0.01 % of $FeSO_4 \cdot 7H_2O$, and 0.00005 % of $MnSO_4 \cdot 5H_2O$; sterilized at a pressure of 15 lb. per sq. in. for 12 minutes.

In a medium as hereinbefore and hereinafter described, a distilled water is used and unless described as a tap water.

These strains are cultured in the same medium as described in Note 5 for 48 hours at 30°C to give the results shown in Table 1.

Table 1

| Strain | Productivity of CAMP | Colour of colonies | Nutritional requirements | Resistance to 6-mercaptopurine |
|---|---|---|---|---|
| Microbacterium No. 205 | none | yellow | biotin | does not grow in a medium containing 200 γ/ml of 6-mercaptopurine |
| Microbacterium | 0.8 | | | does not grow in a medium contain- |

Table 1-continued

| Strain | Productivity of CAMP | Colour of colonies | Nutritional requirements | Resistance to 6-mercaptopurine |
|---|---|---|---|---|
| No. MT-3 | mg/ml | white | biotin | ing 200 γ/ml of 6-mercaptopurine |
| Microbacterium No. 205-M-32 | 1.5 mg/ml | white | biotin | grows in a medium containing 200 γ/ml of 6-mercaptopurine |

A part of the characteristics of these mutants is the same as stated before, however, the rest of the characteristics is not different from those of the parent strain, Microbacterium No. 205 (ATCC 21376, FERM-P No. 106) and the characteristics of this parent strain are described, for example, in U.S. Pat. No. 3,630,842 in detail.

Naturally, mutants being different in nutritional requirements from their parent strains may be used effectively in the present process by satisfying their nutritional requirements if they are capable of producing CAMP in the presence of $Mn^{++}$, $Fe^{++}$, $Fe^{+++}$ and the like in the concentration as mentioned above without addition of the aforesaid precursors, such as adenine and the like.

Further, strains having properties of chemical reagent-resistant to other chemicals than above-mentioned one, for example, 8-azaguanine, 6-mercaptoguaine and the like, can be also effectively used in the present process if they are capable of producing CAMP in the presence of $Mn^{++}$, $Fe^{++}$, $Fe^{+++}$ in the concentration as mentioned above without addition of the above-mentioned precursors, such as adenine and the like.

Microorganisms used in the present invention and ones generally used in a process for producing CAMP comprising culturing a microorganism having an ability for producing CAMP in the absence of the aforesaid precursors, such as, adenine and the like were compared in the productivity of CAMP when they were cultured in a medium containing $Mn^{++}$, $Fe^{++}$, $Fe^{+++}$ in various concentrations. The results obtained are shown below as experimental example.

EXPERIMENTAL EXAMPLE

Each strain as shown in Table 2 was precultured in a slant culture medium composed of 0.5 % of $(NH_4)_2SO$, 0.5 % of $KH_2PO_4$, 0.5 % of $K_2HPO_4$, 0.05 % of $MgSO_4.7H_2O$, 1.0 % of potassium aspartate, 1 % of glucose, 0.01 % of $MnCl_2.4H_2O$, 0.02 % of $FeSO_4.7H_2O$, 1 mg/l of biotin, 100 mg/l of potassium pantothenate, 10 mg/l of thiamine, 2 % of agar and of pH 7.0 (adjusted with KOH) at 30°C, for 48 hours.

Separately, each 4 ml of a medium composed of 5 % of glucose, 0.5 % of urea, 0.5 % of $(NH_4)_2SO_4$, 1 % of $KH_2PO_4$, 1 % of $K_2HPO_4$, 0.1 % of cysteine, 100 mg/l of potassium pantothenate, 10 mg/l of thiamine, 1 mg/l of biotin, 1 % of $MgSO_4$ and $Mn^{++}$, $Fe^{++}$ and $Fe^{+++}$ in the various concentrations as shown in Table 2, and of pH 8.0 (adjusted with KOH) was poured into a test tube and subjected to sterilization at 115°C for 15 minutes using autoclave. The obtained seed culture was inoculated in said medium and cultured with shaking at 30°C for 48 hours.

To adjust the concentration of $Mn^{++}$, $Fe^{++}$ and $Fe^{+++}$ in a medium as mentioned above, a tap water was used preferentially since said water generally contains 0.05–1.0 mg/l of $Mn^{++}$ in terms of $MnCl_2.4H_2O$, 0.05–3 mg/l of $Fe^{++}$ and $Fe^{+++}$ in terms of $FeCl_2.7H_2O$ and $FeCl_3.7H_2O$, respectively, and a short amount thereof was adjusted by adding $MnCl_2.4H_2O$, $FeCl_2.7H_2O$ and $FeCl_3.7H_2O$, respectively. In the case of culture composition in which a tap water could not be used, a distilled water was used.

Productivity of CAMP in the thus obtained cultured broth is shown in Table 2.

Table 2

| Metal ion concentraion (mg/l) | | | | | | | | | Productivity of CAMP (mg/ml) | | |
|---|---|---|---|---|---|---|---|---|---|---|---|
| $Mn^{++}$ | | | $Fe^{++}$ | | | $Fe^{+++}$ | | | Microbacterium No. 205-CM7 (ATCC 21979, FERM-P No. 1557) | Microbacterium No. MT-3 (ATCC 21981, FERM-P No. 787) | Microbacterium No. 205-M-32 (ATCC 31001, FERM-P No. 1559) |
| 0.005 | 0.02 | 2.0 | 5 | 10 | 300 | 5 | 10 | 300 | | | |
| O | | | | O | | | O | | 1.2 | 1.8 | 2.5 |
| | O | | | O | | | O | | — | 2.3 | 4.2 |
| | | O | O | | | | O | | — | 2.1 | 4.5 |
| O | | | | O | | | O | | — | 1.8 | 2.8 |
| O | | | | | O | O | | | — | 2.1 | 4.8 |
| O | | | | O | | | | O | — | 1.7 | 2.6 |
| O | | | | O | | | | O | — | 2.1 | 5.1 |
| | O | | | O | | | | O | — | 2.8 | 5.8 |
| | | O | | | O | | | O | — | 2.8 | 5.1 |

In Table 2, the metal ion concentration is represented in terms of $MnCl_2.4H_2O$ in case of $Mn^{++}$, in terms of $FeCl_2.7H_2O$ in case of $Fe^{++}$ and in terms of $FeCl_3.7H_2O$ in case of $Fe^{+++}$, respectively.

The symbol "O" means that each metal ion is contained in a medium with the concentration shown therein, and the symbol "—" means that CAMP can be scarcely produced.

From Table 2, it is recognized that microorganism used in the present process is excellent in the productivity of CAMP even in a medium wherein natural materials containing $Mn^{++}$, $Fe^{++}$, $Fe^{+++}$ and the like in a relatively large amount is used.

Microbacterium No. 205-CM 7 (ATCC 21979, FERM-P No. 1557) used in the above experimental example is obtained from Microbacterium No. 205 (ATCC 21376, FERM-P No. 106) by subjecting it to artificial mutation treatment with diethylsulfate as shown below.

To a 10 ml (Number of cells: 2–5 × $10^9$/ml) of cell suspension of Microbacterium No. 205 (ATCC 21376, FERM-P No. 106) at the logarithmic growth phase is added 0.1 ml of diethyl sulfate and the mixture is kept at 30°C for 60 minutes with shaking to contact well. The resultant is smeared onto an agar plate medium (Note 6) and cultured at 30°C for 48–100 hours. The appeared colonies are picked up at random, inoculated in an agar slant medium (Note 7) and cultured at 30°C for 48–100 hours. Thereafter, the thus cultured microorganism is inoculated in 3 ml of a liquid culture medium (Note 8) in a test tube (diameter: 2 cm, length: 15 cm) and cultured at 30°C for 24 hours with shaking at 289 r.p.m. The accumulation of CAMP in the cultured broth is checked by a paper chromatography.

Note 6

A medium composed of 1 % of glucose, 0.5 % of $(NH_4)_2SO_4$, 0.5 % of urea, 1 % of $KH_2PO_4$, 1 % of $K_2HPO_4$, 0.3 % of casamino acid, 30 γ/l of biotin, 1 % of $MgSO_4·7H_2O$, 2 % of agar and of pH 7.0; and sterilized at a pressure of 15 lb. per sq. in. for 10 minutes.

Note 7

A medium composed of 1 % of beef extract, 1 % of polypeptone, 0.5 % of yeast extract, 0.3 % of NaCl and 2 % of agar and of pH 7.0; and sterilized at a pressure of 15 lb. per sq. in. for 15 minutes.

Note 8

A medium composed of 0.01 % of $ZnSO_4·7H_2O$, 0.5 % of urea, 0.5 % of $(NH_4)_2SO_4$, 1 % of $KH_2PO_4$, 1 % of $K_2HPO_4$, 0.5 % of arginine, 30 γ/l of biotin, 5 % of glucose, 1 % of $MgSO_4·7H_2O$ and sterilized at at pressure of 15 lb. per sq. in. for 12 minutes.

Table 3 is given to compare the productivity of CAMP and nutritional requirements between the parent strain and one of the thus obtained mutants (Microbacterium No. 205-CM7) having a capability of producing CAMP without adding the foregoing precursor to the medium.

Table 3

| Strain | Productivity of CAMP* | Vitamin requirements | Amino acid requirements |
|---|---|---|---|
| Microbacterium No. 205 | none | Biotin | Amino acid is not particularly required, however, asparagine, aspartic acid and arginine promote the growth of the bacteria |
| Microbacterium No. 205-CM7 | 0.7 mg/ml | ditto | ditto |

*The shaking culture was carried out by using a medium (Note 8) at 30°C for 24 hours with 289 r.p.m.

The color of the colony of Microbacterium No. 205-CM7 is yellow, but it changes to white by natural mutation. The CAMP productivity thereof, however, does not change. A part of characteristics of Microbacterium No. 205-CM7 is the same as stated above, however, the rest of the characteristics is not different from those of the parent strain, Microbacterium No. 205.

According to the present process, CAMP can be produced by inoculating the strain capable of being employed in the present process in a medium containing 0.02 mg/l or more of $Mn^{++}$ in terms of $MnCl_2·4H_2O$, 10 mg/l or more of $Fe^{++}$ in terms of $FeCl_2·7H_2O$ and/or 10 mg/l or more of $Fe^{+++}$ in terms of $FeCl_3·7H_2O$ as well as carbon sources, nitrogen sources assimilable to said strain, inorganic phosphates, inorganic salts other than phosphates if desired and other components in an appropriate amount and culturing until the accumulation of CAMP goes up to the maximum. It is preferred, for example, to effect the culture at a pH of 5–10 for 24–120 hours at a temperature of 20°–40°C.

By way of example, the carbon source used in the medium can be a saccharine material such as, for example, glucose, starch hydrolysates, molasses, distillers' soluble, glycerine and the like; and alcohol such as, for example, inositol, mannitol, sorbitol, ribitol and the like; an organic acid such as, for example, fumaric acid, succinic acid, malic acid and the like; hydrocarbons such as, for example, n-paraffin, kerosene and the like, and the nitrogen source can be ammonium sulfate, ammonium chloride, urea, various amino acids, hydrolysate of amino acid high polymers, meat extract, corn steep liquor, rice bran, organism extracts such as fish soluble and yeast extract and the like. The inorganic phosphate can be potassium or sodium dihydrogen phosphate, dipotassium or disodium hydrogen phosphate, ammonium phosphate and the like. The inorganic salts except phosphates can be added if desired to the medium and illustrative of these are magnesium sulfate, magnesium chloride, ferrous or ferric sulfate, ferrous or ferric chloride, zinc sulfate, cobalt sulfate, boric acid, a salt thereof such as potassium borate or sodium borate, fluoride such as potassium fluoride or sodium fluoride, manganese sulfate, manganese chloride and the like. In addition to these, the addition of minor components in favorable and typical of these are Vitamines, such as, for example, biotin, Vitamin $B_1$, Vitamin $B_2$, panthothenic acid and related compounds. Generally speaking, since panthothenic acid is one of the water soluble Vitamin B group and its physiological effect is compatible with that of coenzyme A (CoA) which is biosynthized from panthothenic acid, an intermediary product in the biosynthetic pathway of coenzyme A can be used and illustrative of these are panthothenic acid, β-alanine, panthotheine, panthothine, aspartic acid, valine, dimethyl pyruvate, α-keto-pantoic acid, panthothenyl cysteine, D(+)-4-phospho panthotheine, dephospho coenzyme A, coenzyme A and the like. The derivatives of those compounds (e.g., carnosine or anserine containing β-alanine therein) and natural substances containing those compounds (e.g., yeast extract, corn steep liquor, fish soluble, meat extract, rice bran, molasses, powdered liver, peptone, NZ-amine, distillers' soluble and the like) can be also used.

Thiamine-related substances such as 4-amino-5-aminomethyl-2-methylpyrimidine, 4-methyl-5-β-hydroxyethylthiazole and the like can be used as a substitute for Vitamin $B_1$. The natural substances containing those compounds can be also used.

The accumulation of CAMP can be increased by adding in advance or in the course of culturing to the medium an inhibitor of cyclic-3',5'-nucleotidephosphodiesterase, such as, for example, methylxanthines such as caffeine, theophylline, theobromine or the like, 2,3-, 2,4- or 2,5-pyridinedicarboxylic acid, dipicolinic acid, 8-hydroxyquinoline, polyphosphoric acid, pyrophosphoric acid and the like in the rate of 0.001–500 mg/l.

Further, as hereinbefore set forth, a tap water can also be used very effectively as a substrate of medium.

The production of CAMP can be further increased by adding the foregoing precursors as well as di- or triribonucleotide of bases, which are the foregoing precursors, to the medium in some cases of the present invention.

The culturing may be carried out by an appropriate method e.g., with shaking, with agitation, with aeration or the like. In these cases, it is preferable to effect the stirring and the aeration under such conditions that oxygen transferring rate (Kd) and oxygen supplying rate (KGa) in the fermentor is set during a growing period (8–16 hours after the beginning of cultivation) to control a partial pressure of oxygen dissolved in the culture broth at 0.1–0.6 kg/cm$^2$, and a partial pressure of carbon dioxide at 0.08 kg/cm$^2$ or less, and during a CAMP producing period (16–60 hours after the beginning of cultivation), the former is controlled at 0.2–0.8 kg/cm$^2$ and the latter at 0.05 kg/cm$^2$ or less.

When the accumulation of CAMP attains its maximum, the culture is stopped, and then CAMP is isolated and purified. In the isolation and purification thereof, means such as treatment with active carbon, treatment with a cationic or anionic exchange resin, addition of CAMP-insoluble solvent may be properly employed in combination. For example CAMP contained in the cultured broth from which the fungal bodies have been removed is adsorbed on an active carbon, and and the adsorbed CAMP is eluted with ammoniac aqueous alcohol solution, ammoniac aqueous acetone solution or the like. After the excess ammonia is removed by subjecting the eluate to concentration under reduced pressure or the like, CAMP is adsorbed on an anionic exchange resin [e.g., Dowex I chloride form (Trade mark of Dow Chemical Co., Ltd., U.S.A.), Dowex I formate form or the like] and then the adsorbed CAMP is eluted with an appropriate solvent [e.g., with dilute hydrochloric acid or calcium chloride + dilute hydrochloric acid system for Dowex I (chloride form) or with dilute formic acid or dilute formic acid + sodium formate system for Dowex I (formate form)]. CAMP in the eluate is again adsorbed on an active carbon and the adsorbed CAMP is eluted with ammoniac aqueous alcohol solution, ammoniac aqueous acetone solution or the like. Thereafter, the excess ammonia is removed by subjecting the eluate to concentration under a reduced pressure and CAMP is adsorbed on a cationic exchange resin [e.g., Dowex 50 (H$^+$ form)]. The adsorbed CAMP is eluted with dilute hydrochloric acid. CAMP can be separated in the form of crystal by concentrating the thus obtained eluate under reduced pressure and leaving the resultant in a cold chamber or adding CAMP-insoluble solvent such as alcohol, acetone or the like to the eluate.

For another method, CAMP in the fungal body-free cultured broth is adsorbed on an active carbon and the adsorbed CAMP is eluted with ammoniac aqueous alcohol solution, ammoniac aqueous acetone solution or the like. Thereafter, the excess ammonia is removed by subjecting the eluate to concentration under reduced pressure or the like and an organic solvent is added to the resultant under acidic condition with hydrochloric acid to obtain crude crystals of CAMP. The crude crystals may be purified with the foregoing anionic exchange resin or cationic exchange resin. The purified crystalline CAMP may be also obtained by dissolving the crude crystals to water, decoloring the resultant using a decolorizing resin [e.g., Duolite S-30 (Trade mark of Chemical Process Co., Ltd., U.S.A.)] under acidic condition with hydrochloric or sulfuric acid and adding a CAMP-insoluble solvent such as alcohol, acetone or the like to the decolorized solution. The crystal of CAMP may be obtained by adsorbing CAMP in the fungal body-free cultured broth directly on an anionic or cationic exchange resin, subjecting the eluate to active carbon treatment and purification with a decolorizing resin and adding CAMP-insoluble solvent to the resultant.

Alternatively, the crystal of CAMP may be obtained by adsorbing CAMP in the fungal body-free cultured broth on an active carbon, washing it sufficiently with water, subjecting it to elution with 10–50 % of methyl alcohol aqueous solution, ethyl alcohol, n-propyl alcohol, iso-propyl alcohol, an aceton aqueous solution, a butyl alcohol aqueous solution, an amyl alcohol aqueous solution and the like, concentrating the eluate and then allowing the concentrate in an acidic condition at a low temperature.

The product as produced according to the present process coincides with the authentic CAMP in results of elementary analysis, assays of ribose and phosphorus, ultraviolet absorption and infrared absorption spectra.

As stated above, according to the present process, CAMP can be produced in a culture broth containing ordinary nutritive sources in the presence of $Mn^{++}$, $Fe^{++}$, $Fe^{+++}$ and the like in a relatively high concentration, so that natural products containing a relatively large amount of metal ions as mentioned above as a substrate of medium, such as for example, a tap water, a beef extract, an amino acid solution, a solution containing hydrolyzed protein, corn steep liquor, rice bran, molasses, fish soluble, distiller's soluble and the like can be used as they are, whereby CAMP can be produced at a lower price. Thus, the present process is very advantageous as a process for producing CAMP.

The following examples are given to illustrate the present invention but are not to be considered a limitation thereupon.

EXAMPLE 1

Microbacterium No. MT-3 (ATCC 21981, FERM-P No. 787) was precultured in a slant culture medium composed of 1 % of meat extract, 1 % of polypeptone, 0.5 % of yeast extract, 0.3 % of sodium chloride, 0.0005 % of $MnCL_2.4H_2O$ and 2 % of agar at 30°C for 48 hours. The obtained seed culture was inoculated in 40 ml each of a medium in a 500 ml flask for shaking culture; said medium composed of 5 % of glucose, 1 % of urea, 0.5 % of $KH_2PO_4$, 0.5 % of $K_2HPO_4$, 1 % of polypeptone, 0.5 % of corn steep liquor, 0.1 % of rice bran, 1 % of $MgSO_4.7H_2O$, 0.0001 % of $MnCl_2.4H_2O$, 0.025 % of $FeSO_4.7H_2O$, 0.025 % of $Fe_2(SO_4)_3.xH_2O$, 0.01 % of $ZnSO_4.7H_2O$, tap water and of pH 7.5 (adjusted with 3N-KOH aqueous solution) was poured into a 500 ml flask for shaking culture at the rate of 40 ml per flask, respectively, and sterilized at 115°C for 10 minutes using an autoclave (The concentrations of $Mn^{++}$, $Fe^{-+}$ and $Fe^{+++}$ in the autoclaved medium were 1.1 mg/l as $MnCl_2.4H_2O$, 350 mg/l as $FeCl_2.7H_2O$ and 400 mg/l as $FeCl_3.7H_2O$, respectively). The inoculated medium was kept for culturing at 30°C for 40 hours with shaking to give 2.3 mg/ml of CAMP.

The cultured broth was centrifuged to remove the fungal bodies and the supernatant of the broth adjusted to pH 2 with 3N HCl aqueous solution was adsorbed on an active carbon. The adsorbed CAMP was eluted with 50 % ethyl alcohol aqueous solution containing 1.4 % of ammonia and the eluate was concentrated under reduced pressure to remove excess ammonia, and then adjusted to pH 8.0 with 2N-aqueous ammonium hydroxide. The resultant eluate was passed through a column packed with Dia ion SA-11A (Trade mark for styrene type, strong basic anion exchange resin manufactured by Mitsubishi Chemical Industries Limited) to adsorb CAMP. Subsequently, the column was washed with 0.08 N formic acid solution and the adsorbed CAMP was eluted with 0.2 N formic acid solution. The eluate was agaain adsorbed on an active carbon and the adsorbed CAMP was washed with water and then eluted with 50 % aqueous ethanol solution containing 1.4 % of ammonia. The eluate was concentrated under reduced pressure until crystalline substances were formed and adjusted to pH 2.0 with 5N-hydrochloric acid. Thus, crystal of CAMP was formed. After left to standing the eluate over night, crystalline product formed was recovered by filtration, and dried in vacuo at a room temperature. Thus, 405 mg of CAMP was obtained from 500 ml of culture medium.

EXAMPLE 2

Microbacterium 205-M-32 (ATCC 31001, FERM-P No. 1559) was precultured in a slant culture medium composed of 0.5 % of urea, 0.5 % of $KH_2PO_4$, 0.5 % of $K_2HPO_4$, 0.05 % of $MgSO_4.7H_2O$, 1 % of casamino acid, 0.5 % of yeast extract, 1 % of glucose, 0.01 % of $MnCl_2.4H_2O$, 100 γ/l of biotin, 100 γ/l of riboflabin, 100 γ/l of folic acid and of pH 7.0 (adjusted with KOH) at 30°C for 48 hours. The obtained seed culture was inoculated in 4 ml each of a medium in a test tube (2 × 16 cm) for shaking culture; said medium composed of 0.00027 % of $ZnSO_4.7H_2O$, 5 % of glucose, 0.5 % of urea, 0.5 % of ammonium sulfate 1 % of $KH_2PO_4$, 1 % of $K_2HPO_4$, 0.3 % of beef extract, 0.3 % of corn steep liquor, 1 % of $MgSO_4.7H_2O$, tap water and of pH 8.0 (adjusted with KOH) was poured into a test tube at the rate of 4 ml per test tube, respectively, and sterilized at 115°C for 15 minutes using an autoclave (The concentrations of $Mn^{++}$, $Fe^{++}$ and $Fe^{+++}$ in the autoclaved medium were 0.15 mg/l as $MnCl_2.4H_2O$, 10 mg/l as $FeCl_2.7H_2O$ and 20 mg/l as $FeCl_3.7H_2O$, respectively). The inoculated medium was kept for culturing at 30°C for 38 hours with shaking. 4.8 mg/l of CAMP was formed in the thus cultured medium. 970 mg of crystal of CAMP was obtained from 500 ml of the above-mentioned cultured medium in the same manner as described in Example 1.

EXAMPLE 3

Each strain shown in Table 4 was precultured in the same slant culture medium as described in Example 2 at 30°C for 48 hours. The obtained seed culture was inoculated in 3 ml each of a medium in a test tube (2 × 16 cm) for shaking culture; said medium composed of 5 % of glucose, 1.0 % of urea, 0.5 % of $KH_2PO_4$, 0.5 % of $K_2HPO_4$, 0.5 % of glycine, 0.01 % of potassium panthothenate, 0.001 % of thiamine, 0.0001 % of biotin, 0.01 % of $ZnSO_4.7H_2O$, 0.00005 % of $MnCl_2.4H_2O$, 1 % of $MgSO_4.7H_2O$ and of pH 8.0 (adjusted with KOH) was poured into a test tube at the rate of 3 ml per test tube, respectively, and sterilized at 115°C for 15 minutes using an autoclave (The concentrations of $Mn^{++}$ in the autoclaved medium was 0.502 mg/l as $MnCl_2.4H_2O$, and of $Fe^{++}$ and $Fe^{+++}$ were less than 0.010 mg/l as $FeCl_2.7H_2O$ and $FeCl_3.7H_2O$, respectively). The inoculated medium was kept for culturing at 30°C for 40 hours with shaking. The amount of CAMP formed in the cultured medium was those as shown in Table 4. Amounts of crystal of CAMP obtained from 500 ml of each cultured medium in the same manner as described in Example 1 was as shown in Table 4.

Table 4

| Strain | Amount of CAMP formed (mg/ml) | Crystal of CAMP recovered (mg) |
|---|---|---|
| Microbacterium No. MT-3 (ATCC 21981, FERM-P No. 787) | 1.2 | 630 |
| Microbacterium No. 205-M-32 (ATCC 31001, FERM-P No. 1559) | 2.5 | 1200 |

EXAMPLE 4

Each strain shown in Table 5 was precultured in the same slant culture medium as described in Example 2 at 30°C for 48 hours. The obtained seed culture was inoculated in 3 ml each of a medium in a test tube (2 × 16 cm) for shaking culture; said medium composed of 5 % of glucose, 1.0 % of urea, 0.5 % of $KH_2PO_4$, 0.5 % of $K_2HPO_4$, 0.5 % of histidine, 0.01 % of potassium panthothenate, 0.001 % of thiamine, 0.0001 % of biotin, 0.01 % of $ZnSO_4.7H_2O$, 0.025 % of $FeCl_3.7H_2O$, 1 5 of $MgSO_4.7H_2O$, and of pH 8.0 (adjusted with KOH) was poured into a test tube at the rate of 3 ml per test tube, respectively, and sterilized at 115°C for 15 minutes using an autoclave (The concentrations of $Mn^+$ $^+Fe^{++}$ and $Fe^{+++}$ in the autoclaved medium were 0.008 mg/l as $MnCl_2.4H_2O$, 0.01 mg/l as $FeCl_2.7H_2O$ and 250.08 mg/l as $FeCl_3.7H_2O$, respectively). The inoculated medium was kept for culturing at 30°C for 40 hours with shaking. The amount of CAMP formed in the cultured medium was those as shown in Table 5. Amounts of crystal of CAMP obtained from 500 ml of each cultured medium in the same manner as described in Example 1 was as shown in Table 5.

Table 5

| Strain | Amount of CAMP formed (mg/ml) | Crystal of CAMP recovered (mg) |
|---|---|---|
| Microbacterium No. MT-3 (ATCC 21981, FERM-P No. 787) | 1.1 | 450 |
| Microbacterium No. 205-M-32 (ATCC 31001, FERM-P No. 1559) | 1.8 | 1050 |

EXAMPLE 5

Each strain shown in Table 6 was precultured in the same slant culture medium as described in Example 1 at 30°C for 48 hours. The obtained seed culture was inoculated in the same culture medium as described in Example 1 except that 0.3 % of each compound as shown in Table 6 was added. The inoculated medium was kept for culturing at 30°C for 40 hours with shaking. CAMP was formed in the thus obtained cultured medium in an amount as shown in Table 6. The crystal of CAMP was recovered in an amount as shown in Table 5 from 1l of each cultured medium in the same manner as described in Example 1. Control test was carried out in the same manner as described above except that no compound as shown in Table 6 was added.

Table 6

| Compound | Microbacterium No. MT-3 (ATCC 21981, FERM-P No. 787) | | Microbacterium No. 205-M-32 (ATCC 31001, FERM-P No. 1559) | |
|---|---|---|---|---|
| | Amount of CAMP formed (mg/ml) | Crystal of CAMP (g) | Amount of CAMP formed (mg/ml) | Crystal of CAMP (g) |
| Hypoxanthine | 5.3 | 2.2 | 7.8 | 3.2 |
| Inosine | 5.8 | 1.8 | 7.9 | 3.8 |
| 5'-Inosinic acid | 5.4 | 2.8 | 8.0 | 4.2 |
| 2'-Inosinic acid | 3.0 | 0.8 | 5.8 | 2.7 |
| 3'-Inosinic acid | 3.0 | 0.6 | 5.7 | 2.3 |
| Inosine-5'-diphosphate | 5.4 | 1.9 | 8.4 | 3.7 |
| Inosine-5'-triphosphate | 5.7 | 2.0 | 7.8 | 3.9 |
| Adenine | 3.2 | 1.1 | 6.4 | 2.8 |
| Adenosine | 5.7 | 1.7 | 8.8 | 3.4 |
| 5'-Adenylic acid | 5.4 | 1.9 | 8.8 | 3.7 |
| 2'-Adenylic acid | 2.9 | 0.8 | 6.3 | 3.0 |
| 3'-Adenylic acid | 2.7 | 0.9 | 6.0 | 2.4 |
| Adenosine-5'-diphosphate | 5.8 | 2.3 | 8.9 | 3.7 |
| Adenosine-5'-triphosphate | 5.9 | 2.5 | 8.4 | 3.8 |
| Succinyl adenine | 3.3 | 1.2 | 6.3 | 2.7 |
| Succinyl adenosine | 3.6 | 1.3 | 7.0 | 3.0 |
| 5'-Succinyl adenylic acid | 3.8 | 1.3 | 6.8 | 3.1 |
| 2'-Succinyl adenylic acid | 2.8 | 0.7 | 5.9 | 2.4 |
| 3'-Succinyl adenylic acid | 3.0 | 0.8 | 5.8 | 2.0 |
| Succinyl adenosine-5'-diphosphate | 3.2 | 1.2 | 6.2 | 2.4 |
| Succinyl adenosine-5'-triphosphate | 3.1 | 0.9 | 6.8 | 2.7 |
| 5-Amino-4-imidazolcarboxamide | 3.7 | 1.2 | 7.2 | 2.8 |
| 5-Amino-4-imidazolcarboxamide riboside | 3.9 | 1.4 | 6.7 | 2.7 |
| 5-Amino-4-imidazolcarboxamide riboside-2'-phosphate | 2.9 | 0.6 | 5.9 | 2.1 |
| 5-Amino-4-imidazolcaraboxamide riboside-3'-phosphate | 3.9 | 1.0 | 6.0 | 2.3 |
| 5-Amino-4-imidazolcarboxamide-5'-triphosphate | 3.7 | 1.3 | 7.3 | 3.4 |
| None (Control) | 2.5 | 0.6 | 5.1 | 2.2 |

What is claimed is:

1. A process for producing 3', 5'-cyclic adenylic acid which comprises culturing under aerobic conditions a strain of microorganism capable of producing 3', 5'-cyclic adenylic acid without using a precursor thereof in the presence of 0.02 mg/l or more of a manganese ion in terms of $MnCl_2 \cdot 4H_2O$, 10 mg/l or more of a ferric ion in terms of $FeCl_2 \cdot 7H_2O$ and/or 10 mg/l or more of a ferrous ion in terms of $FeCl_3 \cdot 7H_2O$, said microorganism comprising a member belonging to the genus Microbacterium, in a medium containing carbon and nitrogen sources, inorganic salts as nutrient sources and one or more of the above-mentioned metal ions in the same concentrations as mentioned above at pH of 5 to 10 and at a temperature of 20° to 40°C until 3', 5'-cyclic adenylic acid is accumulated in the medium and recovering 3', 5'-cyclic adenylic acid from the medium.

2. A process according to claim 1, wherein the microorganism is Microbacterium No. MT-3 (ATCC 21981, FERM-P No. 787) or Microbacterium No. 205-M-32 (ATCC 31001, FERM-P No. 1559).

3. A process according to claim 2, wherein the precursor is added in the medium.

4. A process according to claim 1, wherein the culture is carried out for 24–120 hours.

5. A process according to claim 1, wherein the culture is carried out with shaking, agitation or aeration.

6. A process according to claim 1, wherein the recovering is carried out by treating the medium in which the 3',5'-cyclic adenylic acid is accumulated with an active carbon, an anionic ion exchange resin, a cationic ion exchange resin, a decolorizing resin, vacuum concentration or a solvent incapable of dissolving the desired 3',5'-cyclic adenylic acid.

7. A process according to claim 1 wherein said microorganism is a strain of the species Microbacterium No. 205.

* * * * *